United States Patent [19]

Okamura

[11] Patent Number: 4,736,900
[45] Date of Patent: Apr. 12, 1988

[54] MOTOR CONTROL APPARATUS FOR REEL-TO-REEL TAPE DRIVE SYSTEM

[76] Inventor: Eiji Okamura, Shiticopu Okurayama 2B, 318, Morooka, Kohoku-Ku, Yokohama-Shi, Kanagawa 222, Japan

[21] Appl. No.: 810,096

[22] Filed: Dec. 18, 1985

[30] Foreign Application Priority Data

Dec. 21, 1984 [JP] Japan ................ 59-269892

[51] Int. Cl.$^4$ ................ B65H 59/38; G11B 15/43
[52] U.S. Cl. ................ 242/75.52; 242/187; 242/201; 360/71
[58] Field of Search ........... 242/186, 187, 191, 201, 242/75.52; 360/50, 70, 71

[56] References Cited

U.S. PATENT DOCUMENTS

| | | | |
|---|---|---|---|
| 3,584,805 | 6/1971 | Lee | 242/75.52 X |
| 3,764,087 | 10/1973 | Paananen | 242/191 X |
| 3,781,490 | 12/1973 | Phillips | 360/71 |
| 3,809,335 | 5/1974 | Mantey | 242/186 |
| 3,984,868 | 10/1976 | Ragle et al. | 242/191 |
| 4,015,799 | 5/1977 | Koski et al. | 242/203 |
| 4,125,881 | 11/1978 | Eige et al. | 242/186 X |
| 4,160,195 | 7/1979 | Sakamoto | 242/75.52 X |
| 4,172,231 | 10/1979 | de Costemore d'Arc | 242/191 X |
| 4,289,284 | 9/1981 | Sakamoto et al. | 242/186 |

Primary Examiner—Stuart S. Levy
Assistant Examiner—Katherine Matecki
Attorney, Agent, or Firm—Staas & Halsey

[57] ABSTRACT

A motor control apparatus including a first motor (16) driving a first reel (2) a second motor (26) driving a second reel (1), independently operable to the first motor, and a unit (5) for tensioning a tape being transported between the first and second reels, having a member (51) engaging the tape and an arm (52) jointed to the member, movably fixed and energized by a predetermined force (54) so that the tape energizing the member is tensioned at a predetermined force. The motor control apparatus further includes a unit for detecting a displacement ($\Psi$) of the arm, a transport speed (N) of the tape, a diameter ($D_A$) of the tape wound on the first reel, and a tension (T) in response to the displacement and diameter, and a unit for controlling the first motor in response to the tension and the second motor in response to the transport speed.

31 Claims, 19 Drawing Sheets

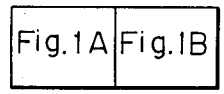
Fig. IA
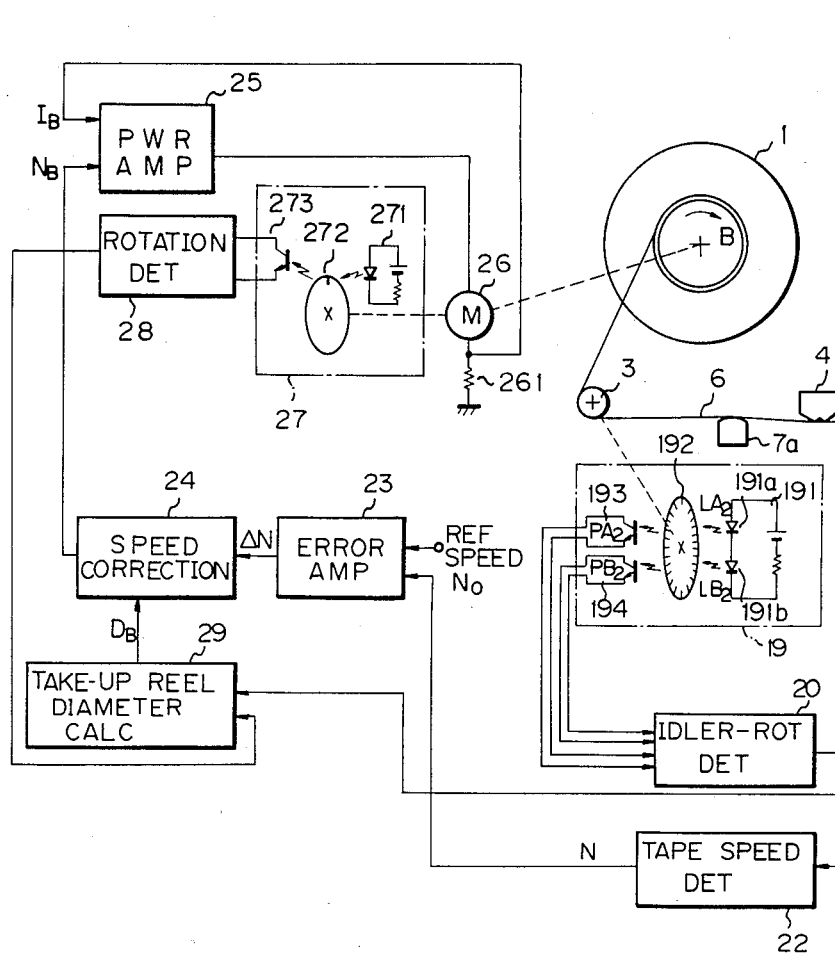

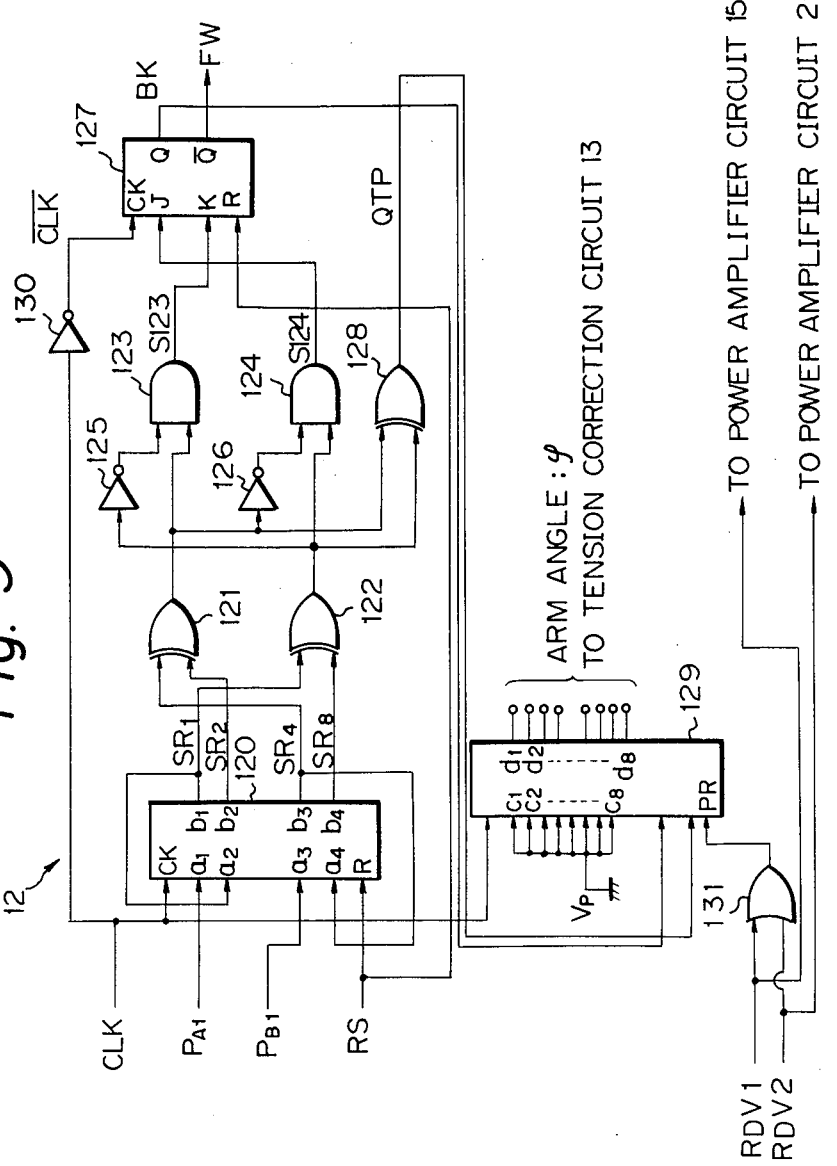

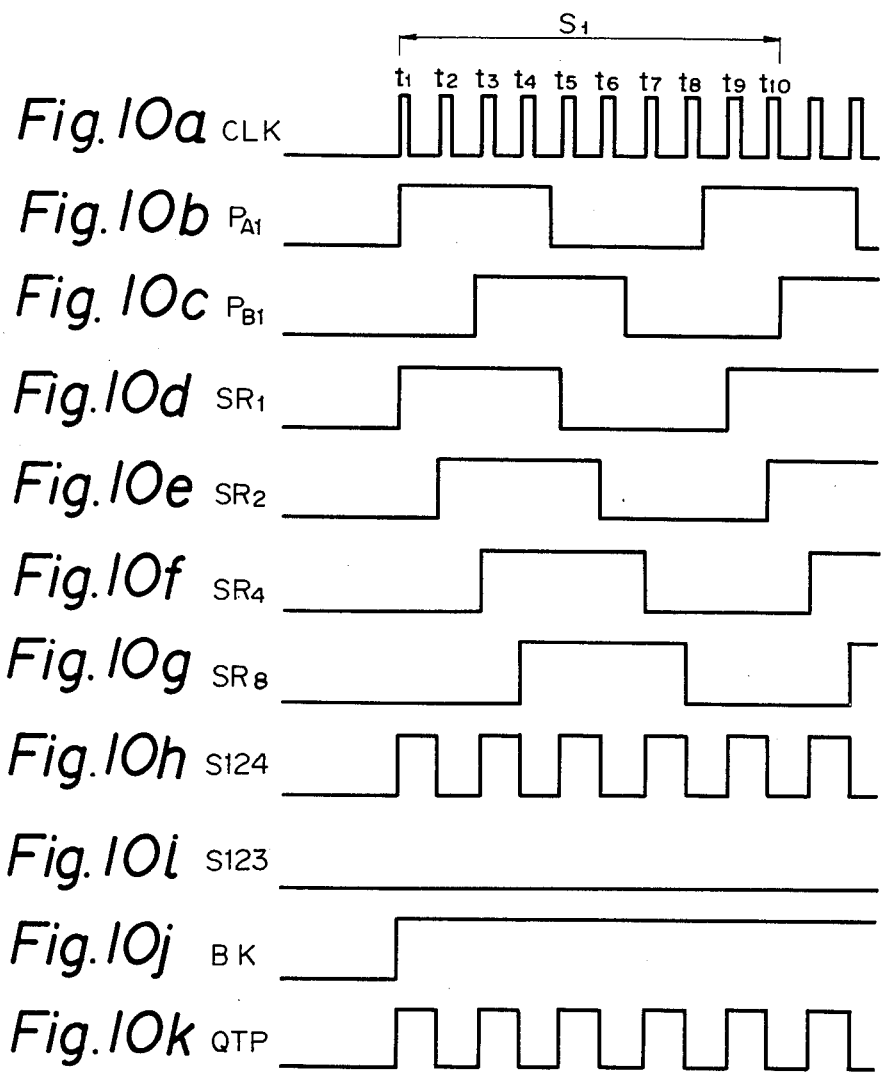

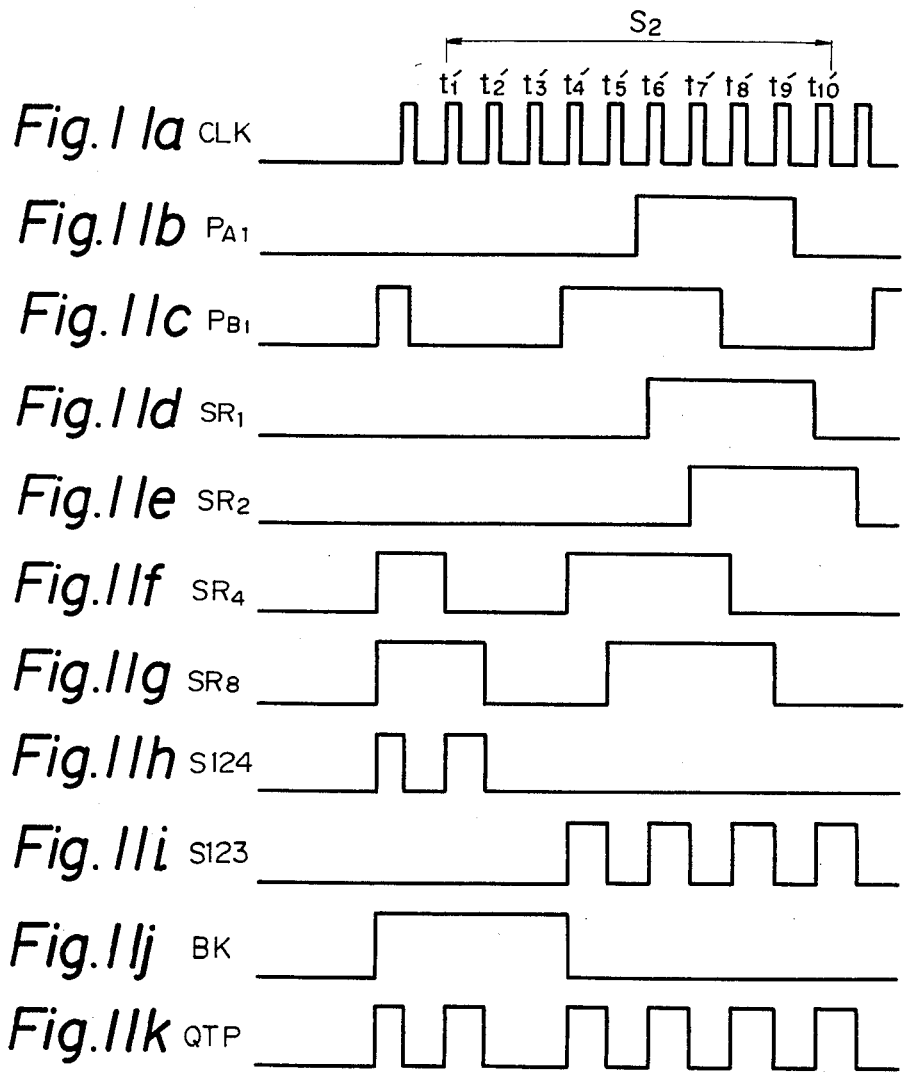

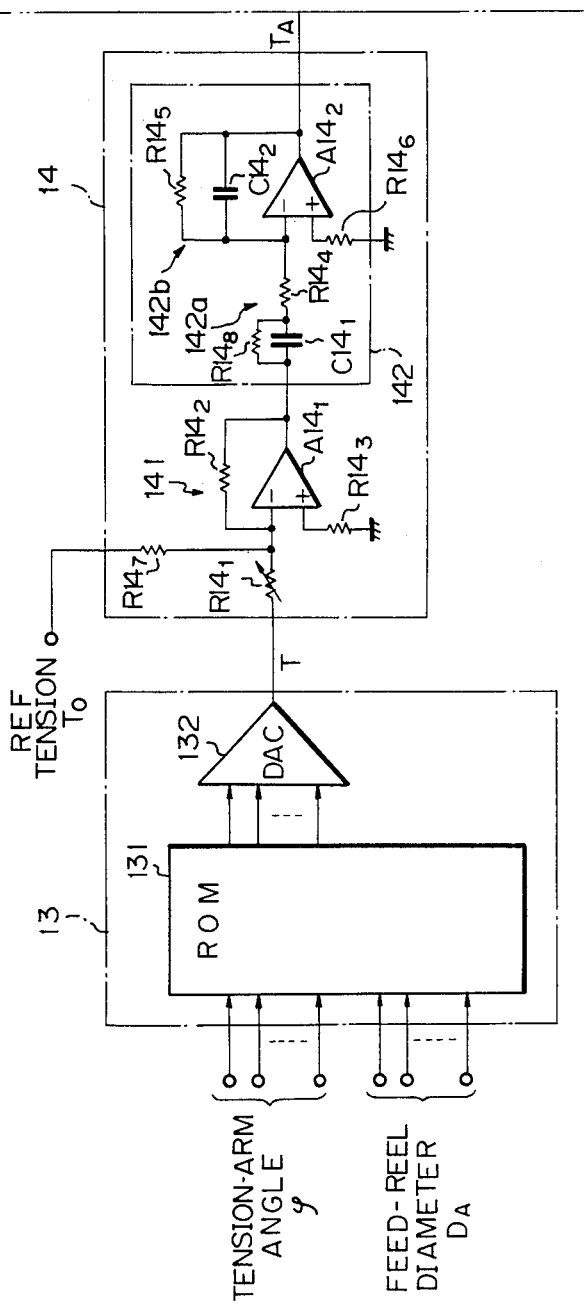

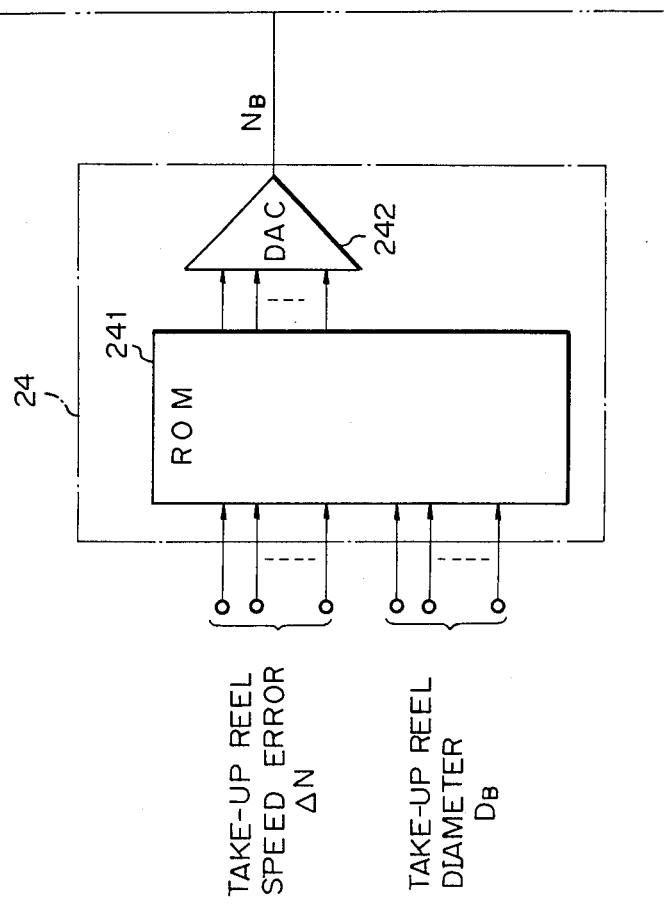

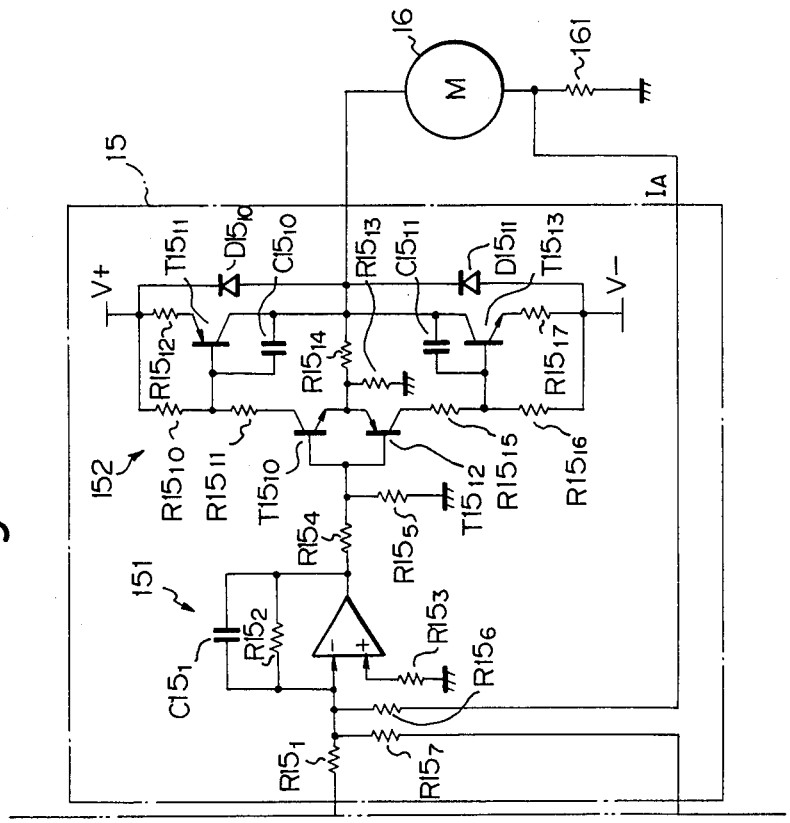

MOTOR CONTROL APPARATUS FOR REEL-TO-REEL TAPE DRIVE SYSTEM

BACKGROUND OF THE INVENTION

1. Field of the Invention

The present invention relates to a motor control apparatus for a reel-to-reel tape system. More particularly, it relates to a magnetic tape motion control apparatus having a tape tension control means for an unbuffered reel-to-reel magnetic tape drive system which includes separate drive motors for each reel.

2. Description of the Related Art

Recently, magnetic tape motion control apparatuses for reel-to-reel magnetic tape systems without tape buffering mechanism, such as capstans, and tape tension control means, such as vacuum columns, have come into use for computer systems.

U.S. Pat. Nos. 3,764,087 and 3,984,868 disclose reel-to-reel magnetic tape motion control systems employing separate drive motors for each reel and requiring no magnetic tape buffering or tachometer in the magnetic tape feed path. In each control system, the reel motors are selectively driven and a tachometer is associated with only the takeup reel shaft to provide one pulse per revolution. The pulses are accumulated in a counter as a continuing count indicative of the radius of the magnetic tape wrapped around that reel. However, in these control systems, only one reel is driven at a time, and no means is installed to provide tension control. Accordingly, the above prior arts suffer from slippage of the magnetic tape and lack of precise control of magnetic tape tension and speed.

In order to overcome the above disadvantage, U.S. Pat. No. 4,125,881 discloses an improved magnetic motion control apparatus for a reel-to-reel magnetic tape drive system. The magnetic motion control apparatus is intended to allow high acceleration rates without magnetic tape slippage, maintain magnetic tape tension substantially constant throughout operation, maintain magnetic tape speed substantially constant between periods of acceleration and deceleration, maintain the magnetic tape position when called for, and control the acceleration rate independently of changes in the reel radii.

The above magnetic motion control apparatus includes a magnetic tape driving mechanism, a group of sensors, and a control circuit. The magnetic tape driving mechanism consists of a pair of motors operated jointly by means of a controller, set forth later, a pair of reels driven by the motors, a read/write magnetic head provided between the reels, and a movable rotor provided between the reels and adjacent to the read/write magnetic head. The sensors are a pair of tachometers each directly connected to the respective reel and detecting a rotation of the reel, and a tension sensor detecting a tension applied to the movable rotor. One tachometer outputs a higher rate of rotation pulses than another tachometer to derive radii of the reels. One tachometer also outputs two different phase signals for detecting a rotational direction of the reels. The controller outputs control signals to the pair of motors to achieve the above-mentioned objects. The controller includes a circuit for providing a single gating pulse each time one of the reels rotates through a relatively large preselected angle, and a circuit for providing a plurality of pulses, one each time the other of the reels rotates through another angle which is substantially smaller than the preselected angle. The controller also includes a counter for counting the number of the plurality of pulses and a circuit in response to the single pulse to gate out the count from the counter. The controller further includes a circuit in response to each such gated out count to provide currents to each of the motors of a magnitude corresponding to the gated out count according to a predetermined servo algorithm for controlling rotation of the reels, thereby to provide continuing changes in currents as the radii of the reels change.

The prior art disclosed in U.S. Pat. No. 4,125,881 still suffers from inaccuracies in fine position control and fine tension control when the magnetic motion control apparatus is applied to a reel-to-reel magnetic tape drive system in which a high density magnetic tape is used.

Magnetic tape has been highly improved in storage density to, for example, 32,000 bits per inch (BPI) in a longitudinal direction and 18 tracks, with a resultant shortening of the interrecord gap (IRG). This requires high position control due to the transport direction and unevenness of characteristics of separate drive motors. The high density magnetic tape enables shortening of the length of the magnetic tape to, for example, 800 feet (243.8 m), with a resultant reduction in the diameter of a reel to, for example, four inches (10.16 cm). This also means a small inertial value of the reel for winding the magnetic tape. The small inertial value means a short delay time in operating the reels, thus facilitating formation of a simplified control system only when the drive system operates in an ideal condition. On the other hand, the drive system having the small inertial value is susceptible to numerous disturbances, such as external noise, unevenness of characteristics of drive motors, and fluctuations of tension applied to the magnetic tape and transport speed of the magnetic tape. Accordingly, in a reel-to-reel magnetic tape drive system in which high density magnetic tape is used, a fine control system is required as a countermeasure for the above disturbances.

In a reel-to-reel magnetic tape drive system, guide means, such as rollers, facilitate control of the tension of the magnetic tape to a predetermined value, but are being eliminated so as to reduce the abrasion of the magnetic tape and facilitate automatic tape loading. As a result, preciser and finer control is necessary, especially fine tension control to the reel-to-reel magnetic tape drive system.

SUMMARY OF THE INVENTION

It is an object of the present invention to provide a motor control apparatus for a reel-to-reel tape system achieving precise position control of a tape with precise tension control for the tape at a predetermined tension.

It is another object of the present invention to provide a motor control apparatus for a reel-to-reel tape system which has less guide means, for minimizing the abrasion of a tape.

According to the present invention, there is provided a motor control apparatus including: a first motor driving a first reel; a second motor driving a second reel, independently operable to the first motor; and a unit for tensioning a tape being transported between the first and second reels, having a member engaging the tape and an arm jointed to the member, movably fixed and energized by a predetermined force, so that the tape engaging the member is tensioned at a predetermined force. The motor control apparatus further includes a unit for detecting displacement of the arm, a transport speed of the tape, a diameter of the tape wound on the first reel, and tension in response to the displacement and diameter, and a unit, operatively connected to the detecting unit, for controlling the first motor in response to the tension and the second motor in response to the transport speed.

More preferably, the first motor is controlled in response to the tension and the transport speed.

According to the present invention, there is also provided a magnetic tape motion control apparatus for an unbuffered reel-to-reel magnetic tape drive system according to the above-mentioned construction.

BRIEF DESCRIPTION OF THE DRAWINGS

Other objects and features of the present invention will be described below in detail with reference to the accompanying drawings, in which:

FIG. 9 is a circuit diagram of a tension arm rotation angle detecting circuit in FIG. 1;

FIGS. 10a to 10k are timing charts showing operation of the tension arm rotation angle detecting circuit in FIG. 9;

FIGS. 11a to 11k are other timing charts showing operation of the tension arm rotation angle detecting circuit in FIG. 9;

DESCRIPTION OF THE PREFERRED EMBODIMENTS

Figure 1B:
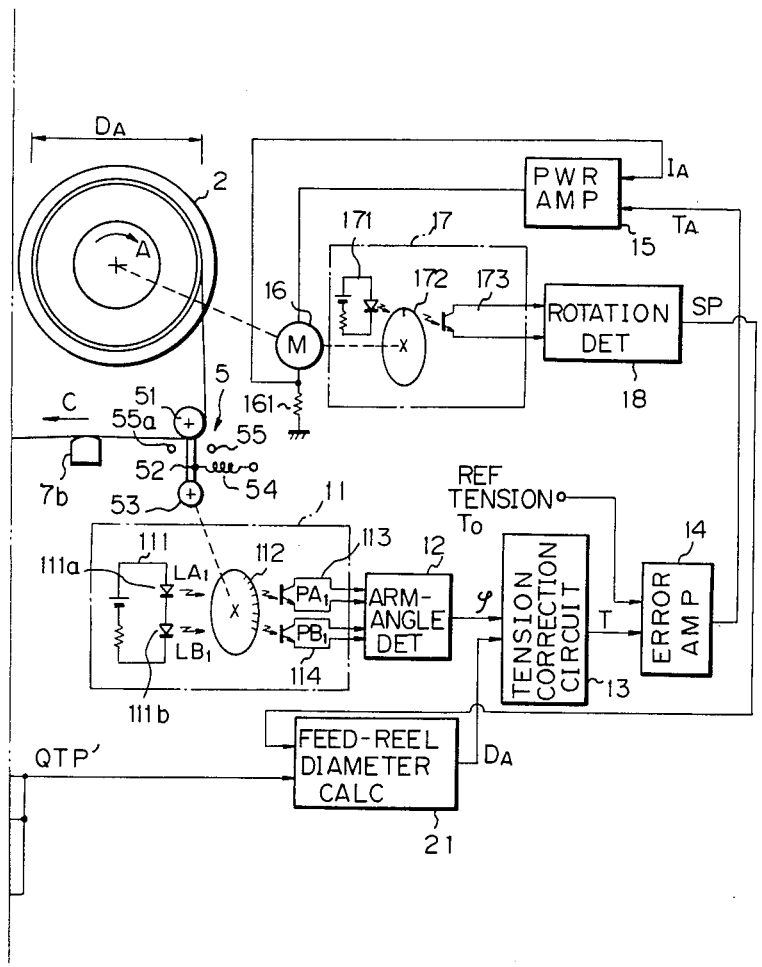
FIG. 1 is a block diagram of a first embodiment of a magnetic tape motion control apparatus according to the present invention.

Referring to FIG. 1, a magnetic tape motion control apparatus of the present invention includes a take-up reel 1 which is driven by a motor 26, a feed reel 2 which is driven by a motor 16, an idling roller 3, a magnetic head 4, a tensioning mechanism 5, and guides 7a and 7b. The motors 16 and 26 are DC motors. In addition, the magnetic tape motion control apparatus includes a tension arm rotation angle sensor 11, a tension arm rotation angle detecting circuit 12, a tension correction circuit 13, an error amplifier circuit 14, a power amplifier circuit 15, a feed reel rotation sensor 17, and a feed reel rotation detecting circuit 18. The magnetic tape motion control apparatus further includes an idling roller rotation sensor 19, an idling roller rotation detecting circuit 20, a magnetic tape wound (feed reel) diameter calculation circuit 21, a tape speed detecting circuit 22, an error amplifier circuit 23, a speed correction circuit 24, a take-up reel diameter calculation circuit 29, a power amplifier circuit 25, a take-up reel rotation sensor 27, and a take-up reel rotation detecting circuit 28.

A magnetic tape 6 is wound off from the reel 2 in a direction A and is wound up by the reel 1 in a direction B passing through the above intermediate members provided between the reels 1 and 2. In this embodiment, the control algorithm is established such that the take-up reel 1 is speed-controlled and the feed reel 2 is tension-controlled, as will be described later in detail.

Figure 2:
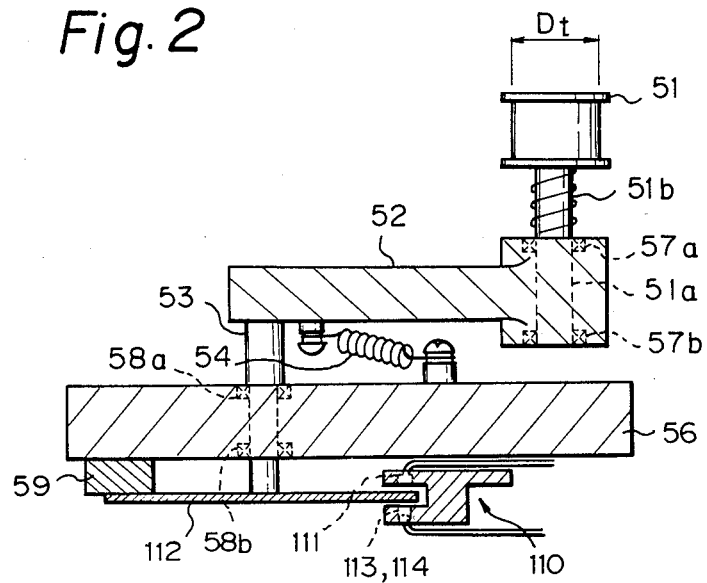
FIG. 2 is a sectional view of a tensioning mechanism and a tension arm rotation angle sensor in FIG. 1.
Figure 3:
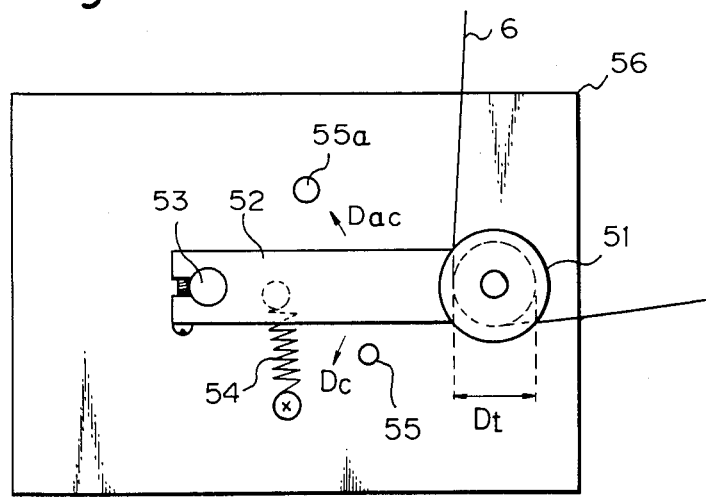
FIG. 3 is a plan view of the tensioning mechanism in FIG. 2.
Figure 4:
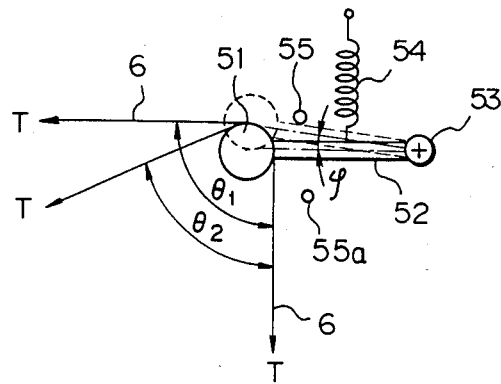
FIG. 4 is a partial view of the tensioning mechanism in FIG. 3, explaining its motion.

Referring to FIGS. 1 to 3, the tensioning mechanism 5 includes a roller 51 tensioning the magnetic tape 6 and changing the transport direction thereof, an arm 52 jointed to the roller 51 at one end through a shaft 51a, one end of which is jointed to a bottom of the roller 51 and another end of which is inserted into a hole of the arm 52, supported by bearings 57a and 57b and slidable with a spring 51b, and a shaft 53 jointed to another end of the arm 52 at one end and passing through a hole provided in a base 56 at another end, supported by bearings 58a and 58b at the hole. The tensioning mechanism 5 further includes stoppers 55 and 55a limiting the rotation of the arm 52 within a range defined by their positions, a spring 54 connected to the arm 52 at one end and fixed to the base 56 at another end, and an elastic friction plate 59 of, e.g., rubber, adhered to a lower surface of the base 56. The arm 52 is rotatable in response to a load according to a magnetic tape tension in a clockwise and counter clockwise directions $D_c$ and $D_{ac}$ in FIG. 3. Referring to FIG. 4, a rotation angle $\Psi$ of the arm 52 is zero when the arm 52 is in contact with the stopper 55, i.e., no load of the magnetic tape 6 is applied to the roller 51, and is increased due to the increment of the application of tension T of the magnetic tape 6. The arm 52 will stop its rotation when the tension T and a spring force F of the spring 54 are balanced in a position between the stoppers 55 and 55a. The spring force F of the spring 54 is defined to give a predetermined tension, such as 1 g, to the magnetic tape 6.

In the prior art, an idling roller or other guide members are provided between the reel 2 and the guide 7b so that a winding angle $\theta$ on the above idling roller corresponding to the roller 51 defined by the incoming magnetic tape 6 to the idling roller and the outgoing magnetic tape 6 is kept at a predetermined value to maintain the tension of the transporting magnetic tape 6 at a predetermined value. This, however, results in the disadvantages set forth before. On the contrary, in the embodiment, the winding angle 8 may be varied in response to the tension T of the magnetic tape 6. Referring to FIG. 4, the following formula may be derived:

$$\psi \approx \frac{T(1 + \cos\theta)}{K} \quad (1)$$

where,

Ψ: rotation angle of the arm 52 (rad),
θ: winding angle (rad),
T: magnetic tape tension (N),
K: proportional constant depending upon of spring constant of the spring 54 (N/rad)

From the above, the rotation angle Ψ is in proportion to the magnetic tape tension T. However, a proportional factor (1+cos θ) may be varied between 1 and 2 in response to a diameter $D_A$ of the magnetic tape wound around the feed reel 2. This involves the difficulty of high accuracy magnetic tape motion control. Thus, the diameter $D_A$ of the magnetic tape wound around the feed reel 2 must be considered for the magnetic tape motion control.

Figure 5:
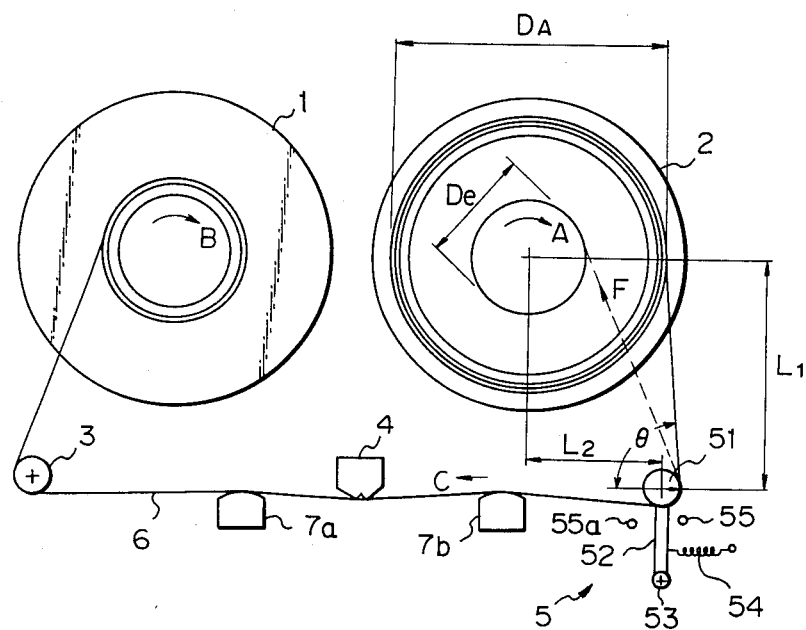
FIG. 5 is a front and partial enlarged view of FIG. 1, explaining the magnetic tape motion.
Figure 6:
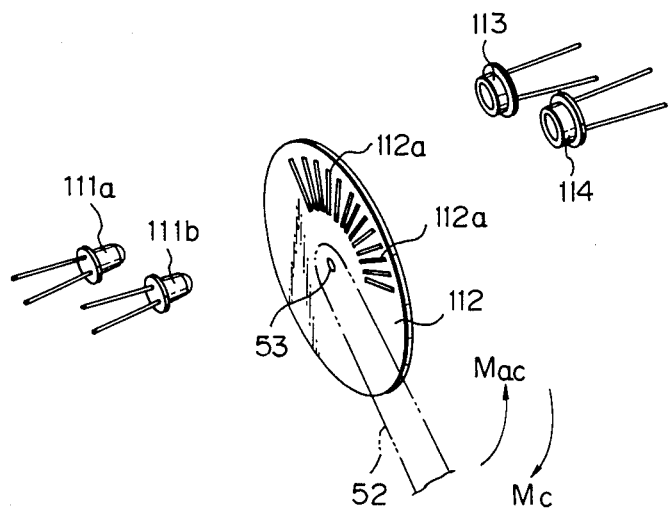
FIG. 6 is a perspective view of a part of the tension arm rotation angle sensor in FIG. 1.

Referring to FIG. 5, the following formula can be derived:

$$\tan\theta \approx \frac{L_1}{L_2 + D_t/2 - D_A/2} = \frac{2L_1}{2L_2 + D_t - D_A} \quad (2)$$

where,

θ: winding angle set forth above, (rad),
θ$L_1$: distance in a vertical direction between a center of the feed reel 2 and a center of the roller 51 (m)
$L_2$: distance in a horizontal direction between a center of the reel 2 and a center of the roller 51, (m)
$D_t$: diameter of the roller 51 (see FIGS. 2 and 3), (m),
$D_A$: diameter of the magnetic tape wound around the reel 2, (m).

From the above formulas (1) and (2), the following formulas can also be derived;

$$\psi = \frac{T}{K}\left(1 + \frac{(2L_2 + D_t - D_A)}{\sqrt{(2L_2 + D_t - D_A)^2 + 4L_i^2}}\right) \quad (3)$$

$$T = K\psi \cdot \frac{\sqrt{(2L_2 + D_t - D_A)^2 + 4L_i^2}}{(2L_2 + D_t - D_A) \pm \sqrt{(2L_2 + D_t - D_A)^2 + 4L_i^2}} \quad (4)$$

In Equation (4), $L_1$, $L_2$, $D_t$, and K are constants. Accordingly, the magnetic tape tension T can be defined as a function of parameters of the rotation angle Ψ of the arm 52 and the diameter $D_A$ of the magnetic tape wound around the reel 2. In FIG. 5, reference $D_e$ designates an internal diameter of the reel 2.

Figure 7:
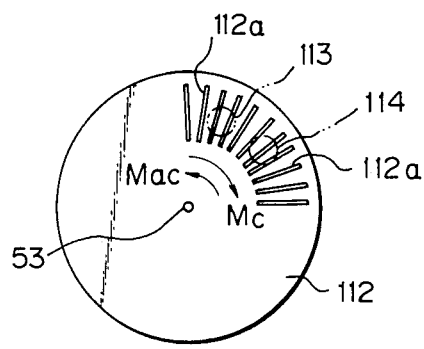
FIG. 7 is a plan view of a disk in the tension arm rotation angle sensor in FIG. 6.
Figure 8:
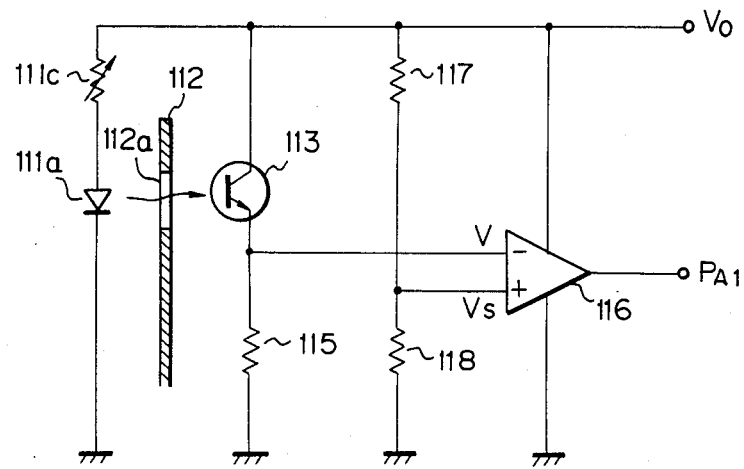
FIG. 8 is a circuit diagram of the tension arm rotation angle sensor in FIG. 1.

The tension arm rotation angle sensor 11 and the tension arm rotation angle detecting circuit 12 are operated together and detect the rotation angle Ψ of the arm 52. Referring to FIGS. 1, 2, and 6 to 8, the tension arm rotation angle sensor 11 includes a disk 112 fixed to the end of the shaft 53 and having a plurality of light transparent slits 112a provided along its circumference at equal intervals, a pair of light emitting diodes (LED's) 111a and 111b mounted on a support member 110 and arranged in parallel on the above circumference at a predetermined distance, and a pair of light receiving transistors (or photodiodes) 113 and 114 mounted on the support member 110 opposite to the LED's 111a and 111b through the slits 112a and arranged in parallel on the above circumference at a predetermined distance, as shown in FIG. 7. The slits 112a are provided within a range sufficient for detecting the rotation angle Ψ. The distance between adjoining slits 42a is defined to discriminate the rotation angle Ψ with a high resolution. Light emitted from the LED's 111a and 111b is directed to expose the slits 112a. Transparent light passing through the slits 112a is detected by the light receiving transistors 113 and 114, respectively. As shown in FIG. 8, illustrating a source pulse signal detecting circuit for a pulse signal $PA_1$, a voltage V, which is converted the received light into an electrical signal at the light receiving transistor 113, and further discriminated by a reference voltage $V_S$ at a comparator 116. The pulse signal $PA_1$ is high level when the voltage V is higher than the voltage $V_S$, otherwise, low level. In FIG. 8, reference 111C designates a variable resistor for changing an electrical current flowing into the LED 111a, and references 115, 117, and 118 resistors. The circuit shown in FIG. 8 may be applied to the LED 111b and the light receiving transistor 114 to generate another pulse signal $PB_1$.

When the disk 112 is rotated by a predetermined angle in response to the rotation of the arm 52, two pulse signals $PA_1$ and $PB_1$, each having one or more pulses corresponding to the above rotated angle, may be obtained from the tension arm rotation angle sensor 11. Due to the distance between the light paths, one path formed between the LED 111a and the light receiving transistor 113 and another formed between the LED 111b and the light receiving transistor 114, the pulse signal $PA_1$ is retarded from the pulse signal $PB_1$ by a predetermined phase, such as 90°, when the disk 112 is rotated in a clockwise direction $M_C$ in FIG. 7, otherwise, the pulse signal $PA_1$ is advanced to the pulse signal $PB_1$. Two phase pulse signals $PA_1$ and $PB_1$ are supplied to the tension arm rotation angle detecting circuit 12.

Referring to FIG. 9, the tension arm rotation angle detecting circuit 12 includes a four-bit register 120 having four input terminals $a_1$ to $a_4$ and four output terminals $b_1$ to $b_4$, an exclusive OR (EOR) gate 121 having input terminals operatively connected to the output terminals $b_2$ and $b_3$, and an EOR gate 122 having input terminals operatively connected to the output terminals $b_1$ and $b_4$. An output of the EOR gate 121 is supplied to an input terminal of an AND gate 123 as well as an input terminal of an AND gate 124 through an inverter 126. An output of the EOR gate 122 is supplied to another input terminal of the AND gate 123 through an inverter 125 as well as another input terminal of the AND gate 124. An output $S_{123}$ of the AND gate 123 is supplied to a K-input terminal of a J-K flip-flop 127. An output $S_{124}$ of the AND gate 124 is supplied to a J-input terminal of the J-K flip-flop 127. The flip-flop 127 receives an inverted clock signal $\overline{CLK}$ at a clock input terminal CK through an inverter 130, resulting in the flip-flop 127 being operable synchronously with a clock signal CLK. The outputs of the EOR gates 121 and 122 are also supplied to input terminals of an EOR gate 128. The tension arm rotation angle detecting circuit 12 further includes an eight-bit up and down counter 129 having eight preset terminals $C_1$ to $C_8$ and eight output terminals $d_1$ to $d_8$ and an OR gate 131.

In an initial condition, a reset pulse RS is generated, and the register 120 and the flip-flop 127 are reset. All inputs at the input terminals $a_1$ to $a_4$ of the register 120 are low level. All inputs at the input terminals of the flip-flop 127 are also low level. A preset terminal PR of the counter 129 receives a logical OR signal which is obtained by means of the logical sum of a feed reel operable signal RDV2 and a take-up reel operable signal RDV1 at the OR gate 131. If either the feed reel 2 or the take-up reel 1 is inoperable, either RDV1 or RDV2 is high level and the logical OR signal is high level, setting the count value in the counter 129 to a preset value defined by a value $V_p$ applied to the input terminals $C_1$ to $C_8$. The preset value indicating an initial rotation angle of the arm 52 is zero in this embodiment. Accordingly, the input terminals $C_1$ to $C_8$ are grounded.

Referring to FIG. 10a to FIG. 10k, the operation of the tension arm rotation angle detection circuit 12 in FIG. 9 will be described.

Two phase pulse signals $PA_1$ and $PB_1$ may be generated from the tension arm rotation angle sensor 11 in response to the rotation of the arm 52. When the arm 52 rotates in a counter clockwise direction $D_{ac}$ in FIG. 3, the disk 112 also rotates in a counterclockwise direction $M_{ac}$ in FIGS. 6 and 7, resulting in the pulse signal $PA_1$ being advanced to the pulse signal $PB_1$ by approximately 90°, as shown in FIGS. 10b and 10c. The pulse signals $PA_1$ and $PB_1$ having the above pulse phase relationship are supplied to the register 120. Upon receipt of the above pulse signals $PA_1$ and $PB_1$, the register 120 calculates a hexadecimal number according to the above phase relationship and the clock signal CLK in a known manner and outputs an output at the output terminals $b_1$ to $b_4$. The output consists of values $SR_1$, $SR_2$, $SR_4$, and $SR_8$, wherein $SR_1$ indicates "2", $SR_2$ "2", $SR_4$ "2", and $SR_8$ "2". Accordingly, the output combined with $SR_1$ to $SR_8$ indicates a hexadecimal number (FIGS. 10d to 10g). A signal S124 output from the AND gate 124 and applied to the J-input terminal of the J-K flip-flop 127 may be alternately and continuously changed between high and low levels (FIG. 10h) in response to the clock signal CLK. A signal S123 output from the AND gate 123 and supplied to the K-input terminal of the J-K flip-flop 127 is kept at low level (FIG. 10i). As a result, the J-K flip-flop 127 may output a backward signal BK of high level at the Q-output terminal (FIG. 10j). The J-K flip-flop 127 functions as a circuit for detecting the rotational direction of the disk 112. A signal QTP output from the EOR gate 128 may be alternately and continuously changed between high and low levels and have the same phase as the signal S124 (FIG. 10k). The signal QTP is generated in response to every rising and trailing edge of the pulse signals $PA_1$ and $PB_1$. The counter 129 receives the clock signal CLK, the backward signal BK from the Q-output terminal of the flip-flop 127, and the pulse signal QTP from the EOR gate 128. The counter 129 counts pulses of the signal QTP. The counter 129 is operable to increase a count value therein in response to application of the signal QTP and the clock signal CLK when the backward signal BK is high level, otherwise to decrease the counted value. In this example, the backward signal BK is high level, thus, the counter 129 increases the count value in response to the application of the signal QTP.

Referring to FIGS. 11a to 11k, timing charts are shown when the rotational direction of the disk 112 is changed from a counter clockwise direction Mac, as set forth above, to a clockwise direction Mc at clock time $t_3'$ (FIG. 11a). After the elapse of above time $t_3'$, the phase of the pulse signal $PA_1$ is retarded to the pulse signal $PB_1$ by approximately 90° (FIGS. 11b and 11c). The signal S124 applied to the J-input terminal of the J-K flip-flop 127 falls to the low level. On the other hand, the signal S123 applied to the K-input terminal may be alternately changed, resulting in the backward signal BK being low level. As a result, the counter 129 decreases the count value in response to the application of the signal QTP.

The value counted at the counter 129 and corresponding to the rotation angle Ψ of the arm 52 is output to the tension correction circuit 13.

Referring back to FIG. 1, the basic construction of the tension arm rotation angle sensor 11 and the tension arm rotation angle detecting circuit 12 can be applied the same to the idling roller rotation sensor 19, the idling roller rotation detecting circuit 20, and the magnetic tape wound diameter calculation circuit 21. A disk 192 in the idling roller rotation sensor 19 is connected to a rotatable shaft (not shown) of the idling roller 3 and thus is rotated in response to the rotation of the idling roller 3 which is rotated by a motion of the magnetic tape 6. The disk 192 has a similar shape of the disk 112 shown in FIGS. 6 and 7, however, must be provided with many transparent slits along the whole circumference thereon. The idling roller rotation sensor 19 outputs pulse signals $PA_2$ and $PB_2$, phases of which differ from each other in response to the rotational direction of the idling roller 3, in accordance with the rotation of the disk 192 (the idling roller 3). The idling roller rotation detecting circuit 20 has a construction similar to that shown in FIG. 9, however, does not include a counter corresponding to the counter 129. The idling roller rotation detecting circuit 20 receives the pulse signals $PA_2$ and $PB_2$ and outputs a pulse signal QTP' which is generated in response to each of the rising and trailing edges of the pulse signals $PA_2$ and $PB_2$, as described above for the signal QTP. The magnetic tape wound diameter calculation circuit 21 includes a counter (not shown) corresponding to the counter 29 for counting the above pulse signal QTP'. The counter in the circuit 21 is reset by a signal SP from the rotation detecting circuit 18, which is generated every rotation of the reel. The thickness of the magnetic tape 6 is previously given. The pulse signal QTP' indicating a transport length of the magnetic tape 6 through the idling roller 3 is obtained. The circuit 21 calculates a diameter $D_A$ of the magnetic tape 6 wound on the feed reel 2. The diameter $D_A$ is supplied to the tension correction circuit 13.

The tape speed detecting circuit 22 receives the pulse signal QTP' and calculates an actual magnetic tape feed speed N by, for example, calculating a time between adjoining incoming pulses of the pulse signal QTP'. The above speed N is supplied to the error amplifier circuit 23 as a feedback signal for controlling the motor 26.

The feed reel rotation sensor 17 includes a disk 172 connected to a shaft of the motor 16 for driving the feed reel 2, a light emitting circuit 171, and a light receiving circuit 179. The disk 172 has one slit. The light receiving circuit 173 outputs a signal for each rotation of the motor 16. The feed reel rotation detecting circuit 18 receives the signal output from the light receiving circuit 173 and outputs the pulse-shaped signal SP connected to the reset terminal of the magnetic tape wound diameter calculation circuit 21.

The take-up reel rotation sensor 27 includes a disk 272, a light emitting circuit 271, and a light receiving circuit 273. The construction and operation of the sensor 27 is similar to those of the sensor 17. The construction and operation of the take-up reel rotation detecting circuit 28 are also similar to those of the circuit 18.

Figure 12B:
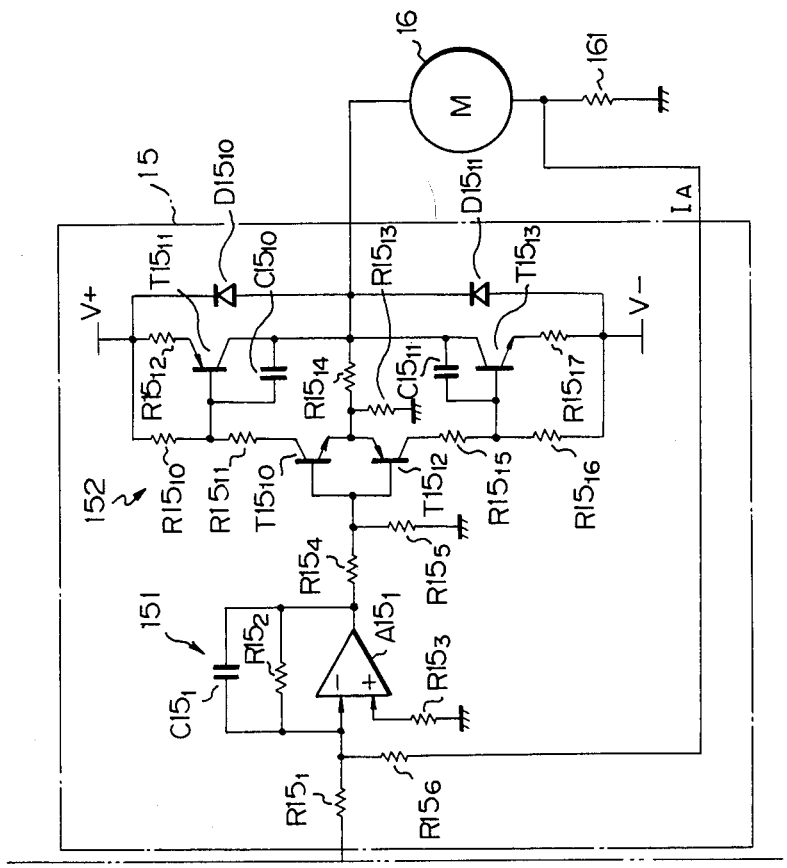
FIG. 12 is a circuit diagram of a tension correction circuit, an error amplifier circuit, and a power amplifier circuit in FIG. 1.

Referring to FIG. 12, the tension correction circuit 13 includes a read-only memory (ROM) 131 and a digital-to-analog converter (DAC) 132. The ROM 131 reads the count value from the tension arm rotation angle detecting circuit 12 and indicates the rotation angle $\Psi$ of the arm 52 and the diameter $D_A$ from the diameter calculation circuit 21. In the ROM 131, a plurality of tension correction data previously calculated in accordance with equation (4) are stored. One tension correction data selected due to the above rotation angle $\Psi$ and the diameter $D_A$ is quickly picked up. The DAC 132 converts the picked-up tension data of a digital type to analog tension data T.

The error amplifier circuit 14 includes an amplifying circuit 141 and a loop filter 142. The amplifying circuit 141 consists of a variable resistor $R14_1$ for adjusting the gain factor K, an amplifier $A14_1$, a feedback resistor $R14_2$, and a resistor $R14_3$. A tension deviation: $\Delta T = a$ reference tension $T_0$—the corrected tension T is obtained and amplified. The reference tension $T_0$ is supplied to an inverted terminal of the amplifier $A14_1$ through a resistor $R14_7$. The loop filter circuit 142 includes a differential circuit 142a, consisting of a capacitor $C14_1$ and resistors $R14_4$ and $R14_8$ series-connected to the capacitor $C14_1$, and an integral circuit 142b, consisting of an amplifier $A14_2$, resistors $R14_5$ and $R14_6$, and a capacitor $C14_2$. The error amplifier circuit 14 gives a proportional, differential, and integral operation of control to a tension control signal $T_A$ for the motor 16 and output therefrom.

The power amplifier circuit 15 includes an amplifier circuit 151 and an output circuit 152. The amplifier circuit 151 consists of resistors $R15_1$ to $R15_3$, an amplifier $A15_1$, and a capacitor $C15_1$ and provides a constant current control for the motor 16. The amplifier circuit 151 calculates a deviation between the tension control signal $T_A$ and a feedback signal which is a voltage dropped at the resistor $R15_6$ passing a current $I_A$ therethrough and amplifies the deviation. The current $I_A$ is a current flowing through the motor 16 and a resistor 161 and is used for the above feedback signal, resulting in the constant current control for the motor 16. The output circuit 152 includes a pnp transistor $T15_{10}$, an npn transistor $T15_{12}$, a pnp power transistor $T15_{11}$, and an npn power transistor $T15_{13}$. The output circuit 152 also includes resistors $R15_4$, $R15_5$, and $R15_{10}$ to $R15_{17}$, capacitors $C15_{10}$ and $C15_{11}$, and diodes $D15_{10}$ and $D15_{11}$. The output circuit 152 outputs a drive current for the motor 16 in response to the above deviation signal. As a result, the tension of the magnetic tape 6 is maintained at a predetermined value.

Referring to FIG. 1, the error amplifier circuit 23 is constructed as the error amplifier circuit 14 shown in FIG. 12. The error amplifier circuit 23, however, calculates a speed deviation signal $\Delta N$ between a reference speed $N_0$ for the motor 26 and the actual speed N detected at the tape speed detecting circuit 22. The take-up reel diameter calculation circuit 29 is also constructed as the feed reel diameter calculation circuit 21 set forth before and outputs a diameter signal $D_B$ of the magnetic tape 6 wound-up on the reel 1.

Figure 13B:
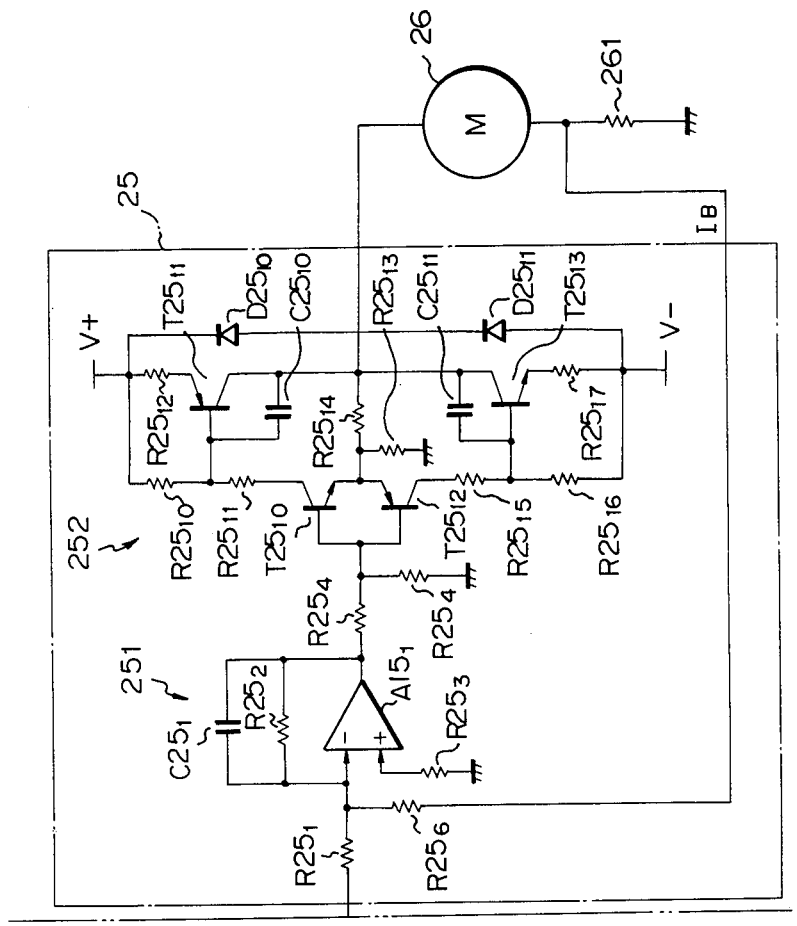
FIG. 13 is a circuit diagram of another error amplifier circuit and another power amplifier circuit in FIG. 1.

Referring to FIG. 13, the speed correction circuit 24 consists of a ROM 241 and a DAC 242. The ROM 241 receives the speed error signal $\Delta N$ and the diameter signal $D_B$. In the ROM 241, a plurality of speed correction data previously calculated are stored. One speed correction data decided by the above signals $\Delta N$ and $D_B$ is promptly chosen. The DAC 242 converts the digital type of the chosen data to an analog type speed signal $N_B$.

The power amplifier circuit 25 shown in FIG. 13 has a substantially same circuit configuration as the circuit 15 shown in FIG. 12. The power amplifier circuit 25 receives the speed signal $N_B$ and an actual current $I_B$ passing flow the motor 26 and a resistor 261 and gives a current for driving the motor 26 in response to a deviation between the signals $N_B$ and a feedback signal proportional to the actual current $I_B$ to realize a constant current control for the motor 26 at the speed $N_B$.

It should be understood from the above description that a correct tension of the magnetic tape 6 can be obtained through detecting the rotation angle $\Psi$ of the arm 52 and the diameter $D_A$ of the magnetic tape 6 wound on the feed reel 2 and correcting the tension on the basis of the rotation angle $\Psi$ and the diameter $D_A$, and thus the magnetic tape motion control may be achieved with a high accuracy of speed and tension, even if the winding angle $\theta$ on the roller 51 is varied by motion of the magnetic tape 6.

Figure 14:
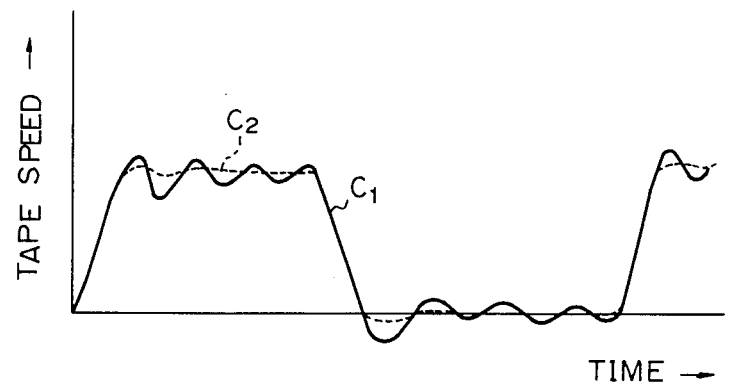
FIG. 14 is a characteristic curve showing a damper effect of an elastic friction plate in the tension arm rotation angle sensor in FIG. 2.

Referring to FIG. 2, the disk 112 is in contact with the elastic friction plate 59, rotatably. If the disk 112 is not in contact with the elastic friction plate 59, the relationship between the magnetic tape speed and the time can be represented by a curve $C_1$ as shown in FIG. 14, when the magnetic tape frequently and continuously starts and stops the relationship between the tension and the time may be the same as the curve $C_1$. If a repetition frequency of the start and stop of the magnetic tape motion is equal or close to a natural frequency of the arm 52 energized by the spring 54, the magnetic tape tension and the magnetic tape motion speed may fluctuate, which is disadvantageous for magnetic tape motion control. On the contrary, since the disk 112 is in contact with the elastic friction plate 59 at a suitable pressure, rotatably, the elastic friction plate 59 acts as a viscosity element against the motion of the arm 52 mechanically jointed to the disk 112, reducing the above fluctuations. In this case, the relationship between the magnetic tape speed or tension and the time can be represented by a dotted curve $C_2$ in FIG. 14. The damping effect increases the accuracy of the magnetic tape motion control set forth above.

From the above, the magnetic tape 6 can be transported between the reels 1 and 2 with a constant speed and a constant tension and can be position-controlled at a high accuracy in response to a start and stop request. As a result, a reliable read and write operation can be established.

Figure 15:
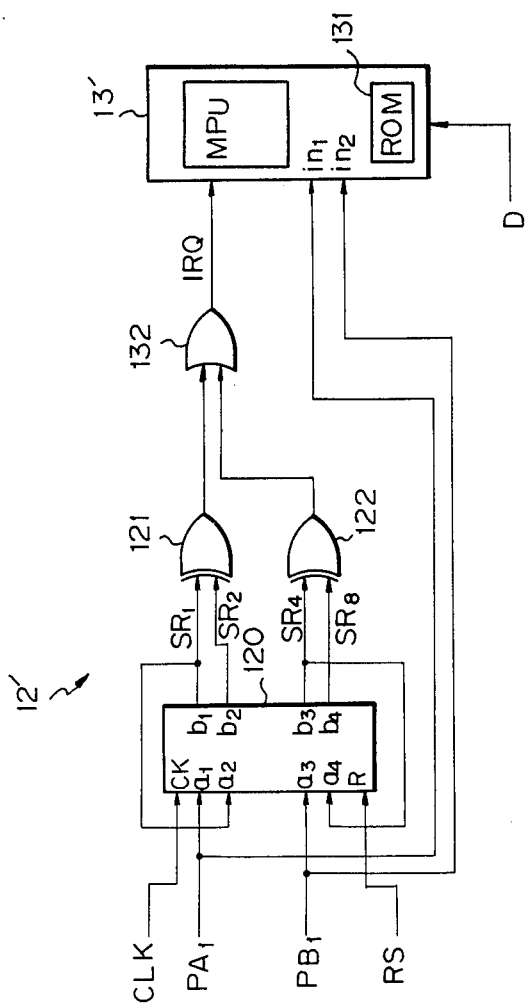
FIG. 15 is another circuit diagram of the tension arm rotation angle detecting circuit in FIG. 1.

FIG. 15 is another circuit diagram of the tension arm rotation angle detecting circuit 12 and the tension correction circuit 13 shown in FIG. 1. The tension arm rotation angle detecting circuit 12' includes a four bit register 120 and EOR gates 121 and 122, which are identical to those in FIG. 9, and an OR gate 132, however, does not include other circuit elements appearing in FIG. 9. The tension connection circuit 13' comprises a microprocessor unit (MPU), a ROM 131, and a DAC 132 (not shown). The ROM 131 and the DAC 132 are similar to those in FIG. 12. The MPU receives an interrupt request signal IRQ from the OR gate 132, which is generated in response to each of the rising and trailing edges of the pulse signals $PA_1$ and $PB_1$, and the pulse signals $PA_1$ and $PB_1$ and calculates the rotation angle $\Psi$ of the arm 52 therein. Accordingly, the above other circuit elements appearing in FIG. 9 are omitted from the tension arm rotation angle detecting circuit 12' shown in FIG. 12 to simplify the circuit configuration. After calculating the rotation angle Ψ, the MPU receives the diameter signal $D_A$ and outputs a corrected magnetic tape tension of an analog type through the DAC 132, as described above.

Figure 16A:
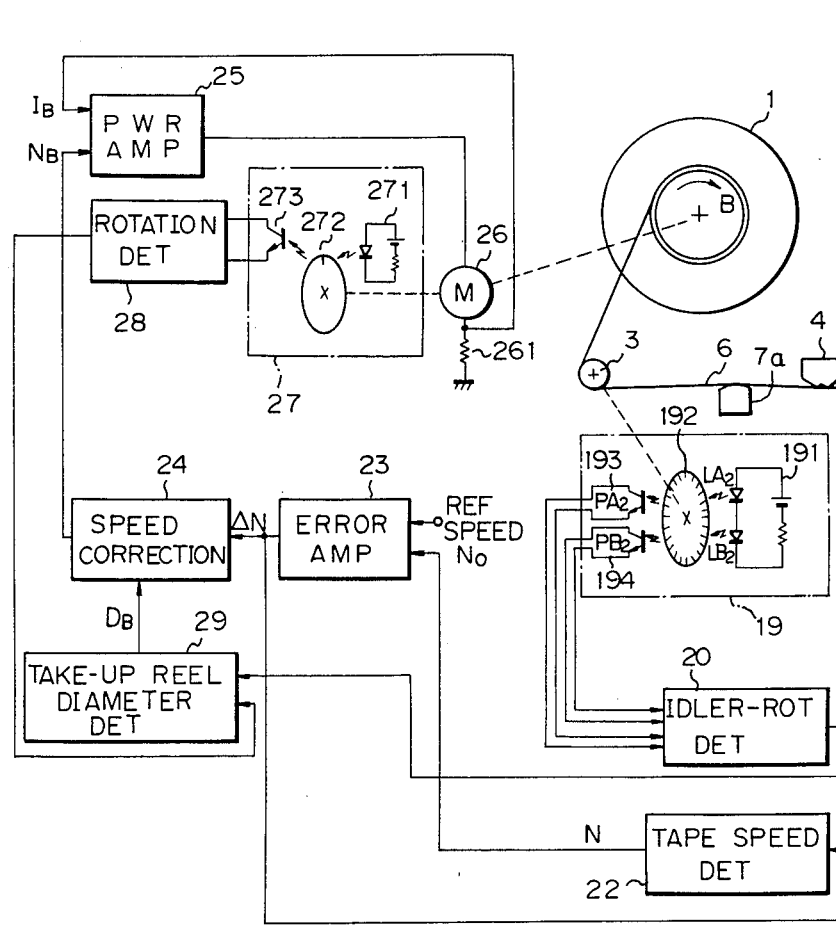
FIG. 16 is a block diagram of another embodiment of a magnetic tape motion control apparatus according to the present invention.
Figure 16B:
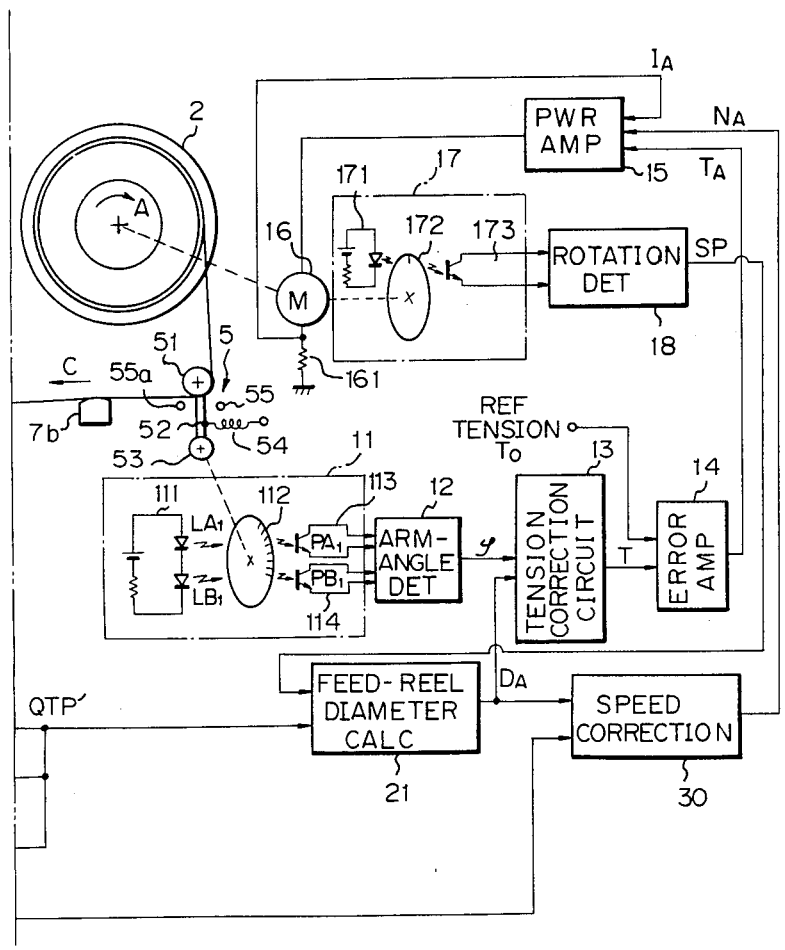

FIG. 16 is a block diagram of a second embodiment of a magnetic tape control apparatus according to the present invention. The magnetic tape control apparatus in FIG. 16 includes a second speed correction circuit 30 in addition to the magnetic tape control apparatus in FIG. 1.

Figure 17A:
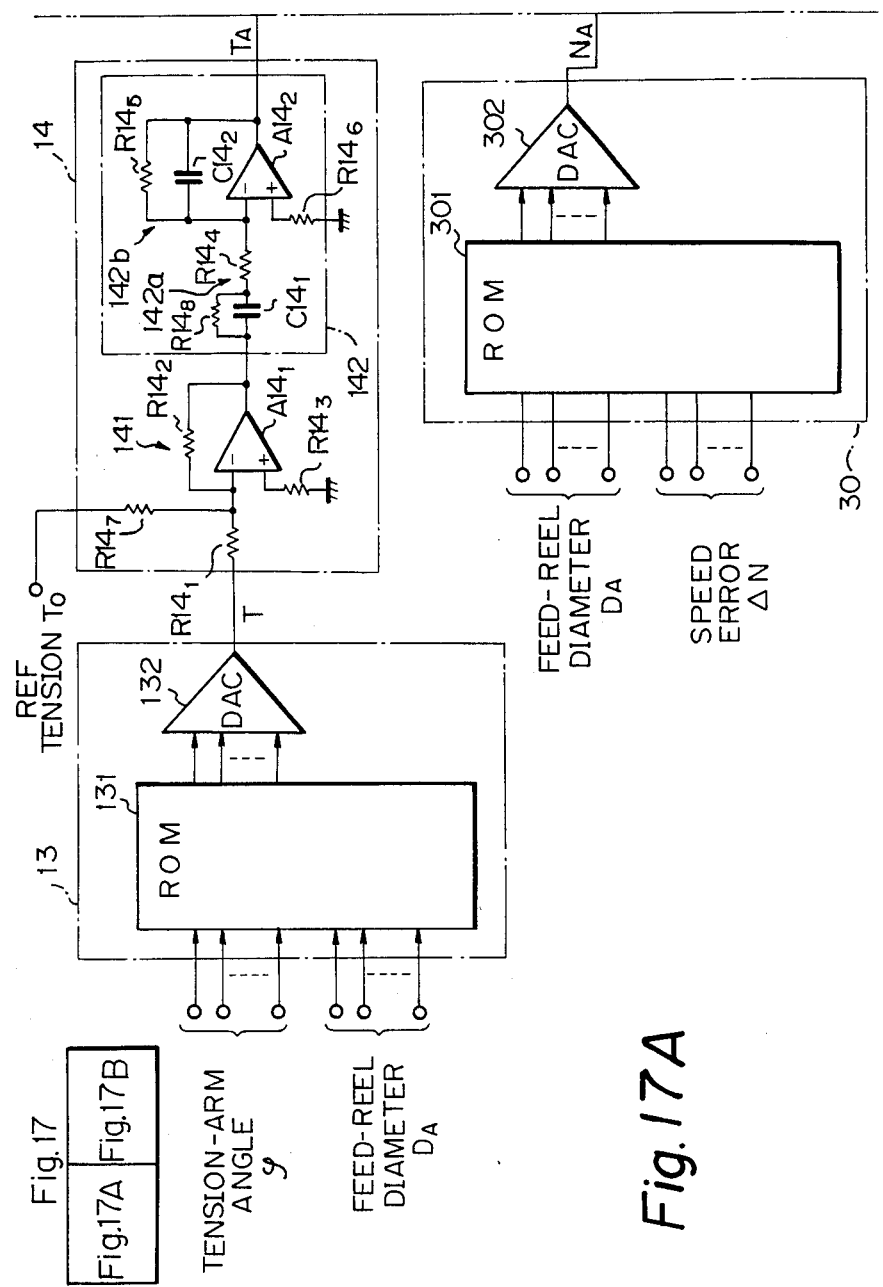
FIG. 17 is a circuit diagram of the tension correction circuit, the error amplifier circuit, the power amplifier circuit, and another speed correction circuit in FIG. 16.

The speed correction circuit 30 receives the diameter $D_A$ of the magnetic tape 6 wound on the feed reel 1 and the speed error ΔN from the error amplifier circuit 23 and outputs a speed control signal $N_A$ for the motor 16 to the power amplifier circuit 15. FIG. 17 is a specific circuit diagram of the speed correction circuit 30 and other circuit diagram relevant to the same. The speed correction circuit 30 includes a ROM 301 receiving the diameter $D_A$ and the speed error ΔN and a DAC 302. The circuit construction and operation are similar to those of the speed correction circuit 24 in FIG. 13. In the ROM 301, a plurality of reference speed data for the motor 16, functions of the diameter $D_A$ and the speed error ΔN, are previously stored. One speed data is chosen in response to the diameter $D_A$ and the speed error ΔN as a reference speed. The reference speed of digital type is converted to an analog type control speed $N_A$ at the DAC 302. The control speed $N_A$ is supplied to the power amplifier circuit 15 and is combined with the control tension $T_A$ so that the motor 16, and thus the feed reel 2, is controlled to maintain the magnetic tape tension at a predetermined value and the magnetic tape transport speed at a predetermined value passing the magnetic head 4. The take-up reel 1 is naturally controlled to maintain the magnetic tape transport speed at the predetermined value.

In control algorithm, the take-up reel 1 is controlled by speed and the feed reel 2 is controlled by speed and tension. This control is considerably complex, but increases the accuracy of control of the magnetic tape motion over that in FIG. 1.

Figure 18:
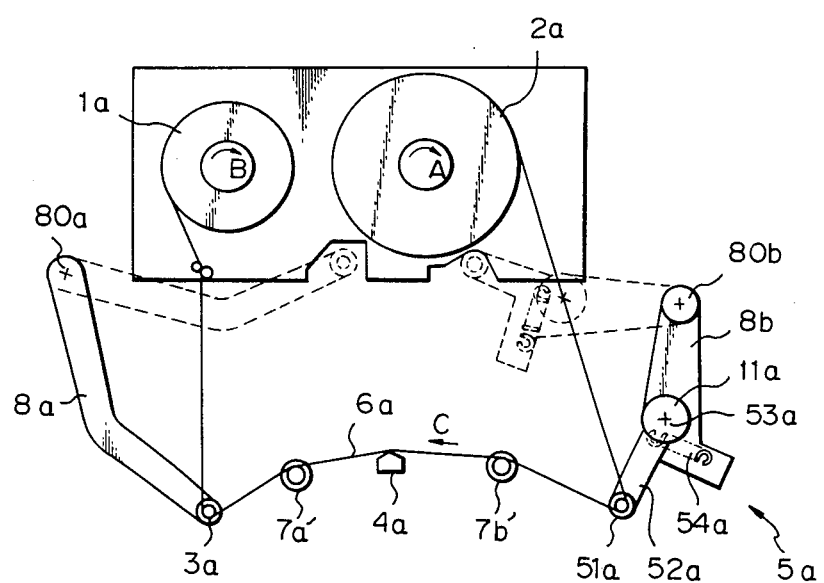
FIG. 18 is a block diagram of still another embodiment of a magnetic tape motion control apparatus according to the present invention.

FIG. 18 is still another embodiment of a magnetic tape motion control apparatus in accordance with the present invention. This magnetic tape apparatus is of a cartridge type.

In FIG. 18, the apparatus includes reels 1a and 2a, an idling roller 3a, a magnetic head 4a, a tensioning mechanism 5a, a magnetic tape 6a, guides 7a' and 7b', arms 8a and 8b, and shafts 80a and 80b. Motors for driving the reels 1a and 2a and control circuits are not shown. The arm 8a is pivotally and rotatably fixed to the shaft 80a at one end and is provided with the idling roller 3a at another end. The arm 8b is also pivotally and rotatably fixed to the shaft 80b at one end and is provided with the tensioning mechanism 5a at another end. The tensioning mechanism 5a comprises a roller 51a connected to a disk (not shown) detecting the rotation angle, an arm 52a, a shaft 53a, and a spring 54a. The arms 8a and 8b can be moved a range between positions shown in a solid line and a dotted line, respectively. When the data store and reproduction operations are effected, the arms 8a and 8b are placed at positions shown by the dotted lines.

Means for sensing a magnetic tape speed, tension, and diameter and control means, described above with reference to FIGS. 1 to 17 can be applied to the magnetic tape motion control apparatus in FIG. 18.

Many widely different embodiments of the present invention may be constructed without departing from the spirit and scope of the present invention. It should be understood that the present invention is not limited to the specific embodiments described in this specification, except as defined in the appended claims.

I claim:

1. A motor control apparatus comprising:
   first motor means driving a first reel;
   second motor means driving a second reel, operable independently of said first motor means;
   tensioning means for tensioning a tape being transported between said first and second reels and wound thereon, the tensioning means comprising an engaging member engaging said tape and an arm joined to said engaging member at once end thereof, said tensioning means being located at a position where a winding angle of the tape engaging said engaging member varies in response to changes in the amount of tape stored on said first reel, said arm being pivotally mounted at one end thereof and movble at said one end thereof joined to said engaging member, said tensioning means including biasing means for biasing said arm by a predetermined force to give a predetermined tension to said tape by engaging said engaging member therewith;
   means for detecting including means for determining a displacement of said arm, means for determining a transport speed of said tape means for determining a diameter of said tape wound on said first reel, and means for determining the tension of the tape in response to said displacement and diameter by compensating for variance of the tension due to change of said winding angle by calculating the tension of the diameter of the tape wound on the first reel and
   motor control means for controlling said first motor means in response to said determined tension and said second motor means in response to said transport speed.

2. A motor control apparatus according to claim 1, wherein said detecting means includes:
   displacement determining means, connected to said tensioning means, for determining said displacement of the arm,
   speed determining means for determining a speed of motion of said tape,
   diameter determining means for calculating said diameter based on a length of said tape moved, obtained by said speed of motion of said tape from said speed determining means and a rotation of said first reel, and
   tension determining means for determining said tension based on said displacement determined by said displacement means and said diameter from said diameter determining means.

3. A motor control apparatus according to claim 2, wherein said arm is pivotable at a first end thereof and radially movable at a second end thereof, said shaft being pivotally rotatable in response to application of tension of said tape to said engaging member, and wherein said displacement detecting means is connected to said shaft and detects a rotation angle of said arm.

4. A motor control apparatus according to claim 3, wherein said displacement detecting means comprises an optical encoder.

5. A motor control apparatus according to claim 4, wherein said optical encoder includes:
- a rotatable disk connected to said shaft of said tensioning means and having a plurality of light transparent slits along a circumference thereof,
- a pair of light emitting devices provided at a first side of said disk at a predetermined distance, both light emitting devices being spaced in parallel along said circumference at a predetermined distance and emitting light directed to said light transparent slits,
- a pair of light receiving devices provided at a second side of said disk at a predetermined distance therefrom and facing said pair of light emitting devices through said disk, said light receiving devices receiving light passing through said slits on said disk and outputting a pair of signals having a phase difference defined by the rotational direction of said disk, and
- a rotation angle detecting circuit detecting said rotation angle of said arm in response to said pair of signals.

6. A motor control apparatus according to claim 5, wherein said light emitting devices comprise light emitting diodes.

7. A motor control apparatus according to claim 5, wherein said light receiving devices comprises phototransistors.

8. A motor control apparatus according to claim 5, wherein said rotation angle detection circuit includes an edge detecting circuit for detecting rising and trailing edges of said pair of signals ($PA_1$, $PB_1$), a rotational direction detecting circuit for detecting said rotational direction of said disk in response to a relationship between said rising and trailing edges, and a universal counter for increasing and decreasing a count value therein in response to said rising and trailing edges defined by said rotational direction, said count value corresponding to said rotation angle of said arm.

9. A motor control apparatus according to claim 5, wherein said disk of said optical encoder is in rotatable contact with a friction member to eliminate vibration on said arm.

10. A motor control apparatus according to claim 3, wherein said tension detecting means calculates said tension T on the basis of the following formula:

$$T = K_1 \psi \frac{\sqrt{K_2 - D_A}}{(K_2 - D_A) \pm \sqrt{K_3 + (K_4 - D_A)^2}}$$

11. A motor control apparatus according to claim 10, wherein said tension detecting means comprises a memory storing the value of said calculated tension in response to said rotation angle and diameter.

12. A motor control apparatus according to claim 2, further comprising roller means guiding the motion of said tape.

13. A motor control apparatus according to claim 12, wherein said speed determining means is operatively connected to said roller means and detects rotation of said roller means and said speed of motion of said tape in response to said rotation of said roller means.

14. A motor control apparatus according to claim 13, wherein said speed determining means include an optical encoder and a tape speed determining circuit for determining said speed of motion of said tape.

15. A motor control apparatus according to claim 14, wherein said optical encoder includes:
- a rotatable disk operatively connected to said roller means and having a plurality of light transparent slits along a circumference thereof,
- a pair of light emitting devices provided at a first side of said disk at a predetermined distance, both light emitting devices being spaced in parallel along said circumference at a predetermined distance and emitting light directed to said light transparent slits,
- a pair of light receiving devices provided at a second side of said disk at a predetermined distance therefrom and facing said pair of light emitting devices through said disk, said light receiving devices receiving light passing through said slits on said disk and outputting a pair of signals having a phase difference defined by the rotational direction of said disk, and
- a rotation detection circuit detecting said rotation of said roller means in response to said pair of signals and a relationship of said phase difference between them.

16. A motor control apparatus according to claim 15, wherein said tape speed determining circuit determines said speed of motion of said tape by calculating time between adjoining signals for one of said pair of signals from said optical encoder.

17. A motor control apparatus according to claim 15, wherei said light emitting devices comprise light emitting diodes.

18. A motor control apparatus according to claim 15, wherein said light receiving devices comprise phototransistors.

19. A motor control apparatus according to claim 2, wherein said motor control means includes:
- a first control signal output circuit outputting a first control signal corresponding to a first deviation between a reference tension and said determined tension from said tension determining means,
- a first motor drive circuit driving said first motor means in response to said first control signal,
- a second control signal output circuit outputting a second control signal corresponding to a second deviation between a reference speed and said detected transport speed from said speed detecting means, and
- a second motor drive circuit for driving said second motor means in response to said second control signal.

20. A motor control apparatus according to claim 19, wherein said first motor drive circuit includes a circuit for supplying a constant current, having a magnitude determined by said first control signal, to said first motor means.

21. A motor control apparatus according to claim 19, wherein said second motor drive circuit includes a circuit for supplying a constant current, having a magnitude determined by said second control signal, to said second motor means.

22. A motor control apparatus according to claim 21, wherein said second control signal output circuit includes:
- a first calculation circuit for calculating said second deviation, a second calculation circuit for calculating a diameter of said tape wound on said second reel based on said transport speed and an amount of rotation of said second reel, and a circuit, connected to said first calculation circuit and said second calculation circuit, calculating said second control signal based on said second deviation and said second diameter.

23. A motor control apparatus according to claim 19, wherein said motor control means further includes a circuit for generating and outputting to said first motor drive circuit a third control signal, for controlling said first motor means at a speed corresponding to said second control signal, said third control signal being calculated based on said second deviation and said diameter.

24. A motor control apparatus according to claim 23, wherein said first motor drive circuit includes a circuit for supplying a constant current, having a magnitude determined by said first control signal and said third control signal, to said first motor means.

25. A motor control apparatus according to claim 2, wherein said detecting means further includes an optical encoder.

26. A motor control apparatus according to claim 25, wherein said first motor means includes a shaft and wherein said optical encoder includes:

a rotatable disk connected to the shaft of said first motor means and having at least one light transparent slit along a circumference thereof, at least one light emitting device provided at a first side of said disk at a predetermined distance therefrom to direct light to said light transparent slits, at least one light receiving device provided at a second side of said disk at a predetermined distance therefrom and facing said light emitting device through said disk, said light receiving device receiving light passing through said slit on said disk and outputting at least one signal in response to rotation of said disk, and a rotation detecting circuit detecting said rotation of said disk.

27. A motor control apparatus according to claim 26, wherein said light emitting device comprises a light emitting diode.

28. A motor control apparatus according to claim 26, wherein said light receiving device comprises a phototransistor.

29. A motor control apparatus according to claim 25, wherein said second motor means includes a shaft and wherein said optical encoder includes:

a rotatable disk connected to a shaft of said second motor means and having at least one light transparent slit along a circumference thereof, at least one light emitting device provided at a first side of said disk at a predetermined distance to direct light to said light transparent slits, at least one light receiving device provided at a second side of said disk at a predetermined distance therefrom and facing said light emitting device through said disk, said light receiving device receiving light passing through said slit on said disk and outputting at least one signal in response to rotation of said disk, and a circuit for detecting said rotation of said disk.

30. A motor control apparatus according to claim 29, wherein said light emitting device comprises a light emitting diode.

31. A motor control apparatus according to claim 29, wherein said light receiving device comprises a phototransistor.

* * * * *

UNITED STATES PATENT AND TRADEMARK OFFICE
CERTIFICATE OF CORRECTION

PATENT NO. : 4,736,900  PAGE 1 of 2
DATED : April 12, 1988
INVENTOR(S) : Okamura It is certified that error appears in the above-identified patent and that said Letters Patent is hereby corrected as shown below:

Front Page, after "[76]" insert the following:

--[75] Assignee: Fujitsu Limited, Kawasaki, Japan--.

Col. 4, line 66, "angle 8" should be --angle $\theta$ --;

Col. 5, line 28, " $\theta L_1$:" should be --$L_1$:--.

Col. 7, line 30, "$"2"$,$SR_2"2"$," should be --$2^0$",$SR_2"2^1"$,--;

line 31, "$SR_4"2"$," should be --$SR_4"2^2"$,--;

line 31, "$SR_8"2"$" should be --$SR_8"2^3"$.--.

UNITED STATES PATENT AND TRADEMARK OFFICE
CERTIFICATE OF CORRECTION

PATENT NO. : 4,736,900

DATED : April 12, 1988

INVENTOR(S) : Okamura

It is certified that error appears in the above-identified patent and that said Letters Patent is hereby corrected as shown below:

Col. 12, line 19, "once" should be --one--;

line 25, "movble" should be --movable--;

line 40, "reel" should be --reel;--.

Col. 13, claim 10, after line 53, insert the following:

--where $K_1, K_2, K_3, K_4$: constants $\Psi$ : rotation angle $D_A$ : diameter--;

line 68, "include" should be --includes--.

Col. 14, line 33, "wherei" should be --wherein--.

Signed and Sealed this

Thirteenth Day of September, 1988

Attest:

DONALD J. QUIGG

*Attesting Officer*     *Commissioner of Patents and Trademarks*